(12) United States Patent
Belli et al.

(10) Patent No.: US 10,513,085 B2
(45) Date of Patent: Dec. 24, 2019

(54) METHOD OF MANUFACTURING A LENS FOR SPECTACLES, A LENS FOR SPECTACLES MANUFACTURED BY THIS METHOD, AND SPECTACLES INCLUDING THIS LENS

(71) Applicant: SAFILO SOCIETÀ AZIONARIA FABBRICA ITALIANA LAVORAZIONE OCCHIALI S.P.A., Padua (IT)

(72) Inventors: Nicola Belli, Padua (IT); Luca Cadorin, Padua (IT); Giorgio Manera, Padua (IT); Afro Rossanese, Padua (IT)

(73) Assignee: Safilo Società Azionaria Fabbrica Italiana Lavorazione Occhiali S.p.A., Padua (IT)

( * ) Notice: Subject to any disclaimer, the term of this patent is extended or adjusted under 35 U.S.C. 154(b) by 114 days.

(21) Appl. No.: 15/529,749

(22) PCT Filed: Nov. 11, 2015

(86) PCT No.: PCT/EP2015/076314
§ 371 (c)(1),
(2) Date: May 25, 2017

(87) PCT Pub. No.: WO2016/083129
PCT Pub. Date: Jun. 2, 2016

(65) Prior Publication Data
US 2017/0297284 A1      Oct. 19, 2017

(30) Foreign Application Priority Data
Nov. 27, 2014   (IT) .............................. PD2014A0327

(51) Int. Cl.
*B29D 11/00* (2006.01)
*B29C 70/74* (2006.01)
(Continued)

(52) U.S. Cl.
CPC ........ *B29D 11/00432* (2013.01); *B29C 70/54* (2013.01); *B29C 70/74* (2013.01); *G02B 1/041* (2013.01)

(58) Field of Classification Search
CPC .................................................. B29D 11/0048
See application file for complete search history.

(56) References Cited

U.S. PATENT DOCUMENTS 6,220,703 B1 *   4/2001   Evans ..................... B29C 51/10
                                                 351/159.56
2004/0084790 A1   5/2004   Blum et al.
(Continued)

FOREIGN PATENT DOCUMENTS

EP              0509190 A2    10/1992

*Primary Examiner* — Lisa L Herring
(74) *Attorney, Agent, or Firm* — Volpe and Koenig, P.C.

(57) ABSTRACT

What is described is a method of manufacturing a lens (2) for spectacles, comprising the steps of providing a lens blank (1) made from plastic material, obtaining, by cutting the blank (1), a corresponding lens having a final shape and profile suitable for mounting in a mounting frame, removing material from the lens (2) in predetermined areas of the lens to produce a first lens portion (3), inserting the first lens portion (3) into a mould (4) for overmoulding, injecting material into the mould (4) to produce at least a second lens portion (5) overmoulded on the first lens portion (3), and removing the lens (2), in which the first and second lens portions (3, 5) are integrated with one another, from the mould (4).

13 Claims, 2 Drawing Sheets

(51) Int. Cl.
*B29C 70/54* (2006.01)
*G02B 1/04* (2006.01)

(56) References Cited

U.S. PATENT DOCUMENTS

| | | | |
|---|---|---|---|
| 2006/0177638 A1* | 8/2006 | Shibuya | C23C 14/0021 428/212 |
| 2006/0287464 A1* | 12/2006 | Takanishi | C08G 79/02 528/86 |
| 2007/0141358 A1* | 6/2007 | Jallouli | B24B 9/146 428/426 |
| 2008/0062381 A1 | 3/2008 | Doshi et al. | |
| 2010/0166978 A1* | 7/2010 | Nieminen | B29D 11/00 427/553 |
| 2012/0140169 A1* | 6/2012 | Mandler | B29D 11/00019 351/178 |

\* cited by examiner

METHOD OF MANUFACTURING A LENS FOR SPECTACLES, A LENS FOR SPECTACLES MANUFACTURED BY THIS METHOD, AND SPECTACLES INCLUDING THIS LENS

TECHNICAL FIELD

The present invention relates to a method of manufacturing a lens for spectacles having the characteristics stated in the preamble to Claim 1, which is the principal claim.

The invention also concerns a lens for spectacles manufactured by the aforesaid method, together with spectacles including the lens.

TECHNOLOGICAL BACKGROUND

In the relevant technical field, there is a known way of producing lenses for spectacles intended to incorporate solely the appropriate optical properties to enable the user to have correct vision, the lenses being designed either as corrective lenses or as protective lenses (such as lenses of sunglasses).

In this field, the development of the technology for manufacturing lenses, particularly lenses of plastic material produced by injection moulding or casting processes, has given rise to the need to incorporate more complex structures into lenses to provide additional functions, other than those solely designed to provide correct vision. It is therefore desirable to combine the optical benefits or properties with purely decorative or functional aspects, designed for example to improve the interfacing of the lens with the main or auxiliary components of the mounting frames. At the same time, there is a need to simplify any additional machining of a lens to achieve the various decorative effects or the various functions that can be obtained in the lens.

DESCRIPTION OF THE INVENTION

The main object of the invention is to provide a method of manufacturing a lens for spectacles and a lens manufactured by this method, the method and the lens being designed to meet the aforesaid requirements while overcoming the limitations of the known solutions.

This and other objects, which will be evident from the following text, are achieved by the invention by means of a method for making a lens and a lens produced by this method, in accordance with the appended claims.

BRIEF DESCRIPTION OF THE DRAWINGS

The features and advantages of the invention will be more apparent from the following detailed description of a preferred example of embodiment thereof, illustrated, for guidance and in a non-limiting way, with reference to the appended drawings, in which.

PREFERRED EMBODIMENTS OF THE INVENTION

Figure 1:
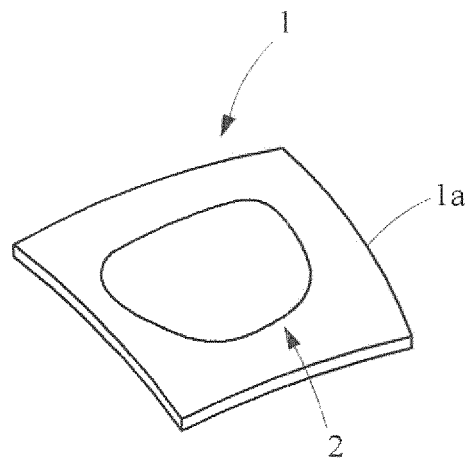
FIG. 1 is a perspective view of an example of a lens blank for spectacles subjected to the manufacturing method of the present invention.

With initial reference to FIG. 1, the number 1 identifies a lens blank to be subjected to the method of manufacturing a lens for spectacles according to the present invention.

The lens blank 1 is made by a process of injecting or casting plastic material into a suitable mould, the process and mould being conventional, and is distinguished by a curved shape with a regular perimetric contour 1a, of rectangular shape, or alternatively of circular shape. The thickness and curvature of the blank substantially correspond to those which the lens must have in order to provide the specified optical properties, except for any protective coatings or coverings to be applied to the lens. In fact, the blank may be provided at the outset with one or more surface coverings, also known as "coatings", for functional and/or aesthetic purposes, such as a scratch-resistant coating, or a hydrophobic and/or oil-resistant coating, a photochromic coating, or a "mirror" effect. The various coatings that can be applied to lenses also include coloured varnishes which have the function of imparting a given chromatic effect to the lens. Coloured varnishes are a possible alternative to the colouring of lenses obtained by dispersing pigments or other colouring products into the lens material. A typical example of the application of coloured varnishes to lenses is the use of varnish to provide an effect of "shading" of the colour, with progressive variation from a higher colour intensity, in a certain area of the lens (generally the upper area), to a lower colour intensity or even total transparency, in another area of the lens (generally the lower part).

The plastic material from which the lens blank 1 is made is selected so as to meet appropriate optical requirements (including transparency, refractive index, UV radiation filtering capacity, etc.), and is of the type normally specified for spectacle lenses.

Among conventional materials, polyamide may be mentioned: this is a thermoplastic material, that is to say one that can be formed by injection moulding. Alternatively, the lens blank may be made of thermosetting plastic material, in which case the blank is produced by a process of casting in a suitable forming mould.

The material of the lens blank 1 may be distinguished by further additional characteristics of the functional and/or aesthetic type. For example, it can be variously coloured, with various degrees of intensity and/or transparency.

In a subsequent step of the manufacturing method, provision is made to produce the final lens structure 2 from the lens blank 1 by cutting, the final structure having a final shape and profile, suitable for mounting in a corresponding mounting frame. More precisely, the cutting machining may be combined with machining, also of the mechanical type, for producing a specific edge profile of the lens. In other words, the cutting may be followed by the production of the bevel of the lens, or alternatively the groove of the lens, if specified for coupling the lens to the specified mounting.

FIG. 1 shows the perimetric profile of the lens 2, along which the operation of cutting the blank 1 takes place.

A further step of the method provides for the removal of material in preselected areas of the lens 2, thus producing a first lens portion, identified by the number 3.

The removal of material from the lens preferably consists in removal by mechanical machining, for example by milling (with the tool T in FIG. 2) with a numerically controlled machine; alternatively, this removal may be carried out by laser machining.

The removal of material may result in a reduction, that is to say a decrease in thickness, in previously shaped areas of the lens blank, for example near areas next to the perimetric contour of the lens 2, but may also affect other areas of the lens in various locations on the opposite face of the lens.

As a result of the removal of material, one or more surfaces are defined in the first lens portion 3, these surfaces becoming points for contacting and adhering to a material deposited on them by an overmoulding process, as described more fully below.

If the lens blank 1 or the lens 2 are provided with one or more surface coatings of the type described above, for functional or aesthetic purposes, the removal of surface material from the lens 2 in the areas subjected to subsequent overmoulding comprises the removal of these surface layers or coatings. This is because, in many cases, the coatings concerned would adhere poorly to the materials to be injection moulded on to the first lens portion 3, and therefore the removal of these coatings is helpful, or indeed necessary, for the purpose of providing optimal adhesion between the different materials.

The step of removal may optionally be followed by a step in which the surface produced by the removal of material can be further modified to increase the adhesion between the material of the first lens portion and the material overmoulded on to it.

It is possible, for example, to provide machining for physically modifying the surface of the blank in the area subjected to removal of material, with the aim of creating the conditions for good adhesion between the material of the lens blank and the materials to be overmoulded. For example, an increase in localized surface roughness, produced by suitable mechanical machining, may provide a better grip between different materials in some cases.

Similarly, mechanical machining for providing more or less marked and more or less localized variations in thickness, according to a more or less ordered geometrical model, may help to increase the adhesive force between the components in contact with one another. For example, a series of blind holes, slots, or other local reductions, of regular or irregular shape, can be provided, to create an additional "mechanical" grip between the materials.

In some cases, where a substantial increase is required in the adhesive force between different materials, if these materials are originally less chemically compatible, the reduction operation may be followed by a special treatment for chemically modifying the surface of the blank in the areas subject to overmoulding. For example, it is possible to provide for the localized application of a different surface coating, such as a varnish of the "primer" type (an adhesion promoter), to which the overmoulded material can adhere more easily.

As regards the removal of material and the consequent overmoulding of material, the material may be overmoulded not only on the edges of the lens but also on the front surface 2a of the lens, or alternatively on the opposite rear surface 2b, or on both surfaces of the same lens.

Figure 2:
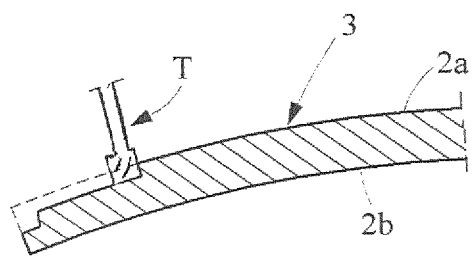
FIG. 2 is a sectional view on an enlarged scale of a lens produced from the blank of FIG. 1, in a further operating step of the method.

FIG. 2 shows an embodiment of the first lens portion after a reduction of the lens edge along the perimetric profile located on one (2a) of the opposite surfaces of the lens.

After the removal of material and the preparation of the surfaces for adhesion to the material to be overmoulded, the method provides for the insertion of the first lens portion 3 into a mould 4 for overmoulding, this mould being, for example, formed by a pair of half-moulds 4a, 4b which can be clamped together to define the mould cavity.

The method then provides for the injection of material into the mould to form a second lens portion 5 overmoulded on to the first portion 3.

Figure 4:
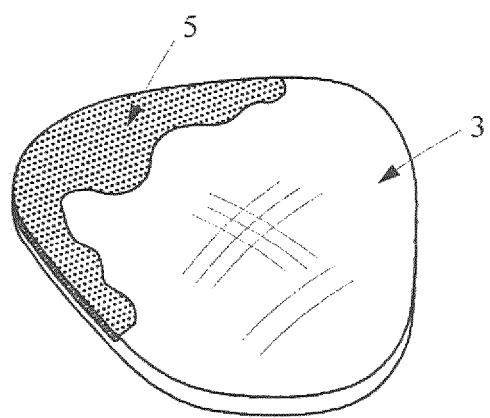
FIG. 4 is a perspective view of the lens of the preceding figures, in the final configuration produced by the aforesaid manufacturing method.
Figure 3:
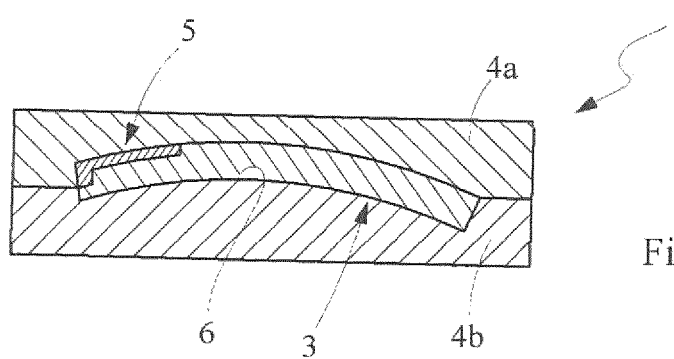
FIG. 3 is a sectional view of the example of a lens of FIG. 2 in a subsequent and different step of the method.

The subsequent opening of the mould 4 permits the removal of the lens from the mould, the first lens portion 3 and the second lens portion 5 being integrated with one another to form a single lens body, although the aforesaid two portions can still be distinguished within this body (FIG. 4).

A seat 6 for receiving the first lens portion 3 is provided in advance in the mould cavity, and the remaining volume of the mould cavity is designed to define the space occupied by the injected material which forms the second lens portion 5.

Figure 5:
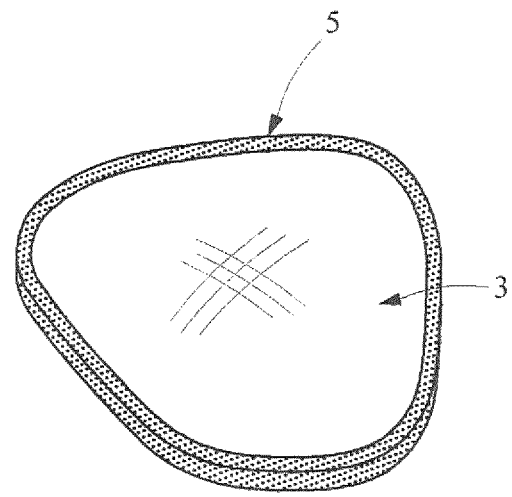
FIG. 5 is a view, corresponding to that of FIG. 4, of a second example of a lens made by the method of the invention.

FIG. 5 shows another embodiment in which the thickness reduction and the consequent overmoulding of material extend along the whole perimetric profile of the lens, next to the edge.

The material may be overmoulded not only on the edges but also on the front surface of the lens, or alternatively on the opposite rear surface (the surface directed towards the user's face when the spectacles are worn), or, as a further alternative, on both of the opposite surfaces of the same lens.

The perimetric portion of the second overmoulded portion 5, as seen on either the front or the rear surface of the lens, may form a theoretical continuation of the lens contour, or may be outside (projecting from) the contour or edge of the lens, or may be inside (recessed from) the contour or edge of the lens, according to the specific aesthetic or functional aim to be achieved with the overmoulded portion.

It is also to be understood that there are no limits to the number of overmouldable portions of the lens, since it is possible to overmould one or more than one portion according to specific requirements.

A first type of lens that can be produced by the method described is that which is known for convenience as a "constant thickness" lens. More precisely, this is a lens in which every part, including the overmoulded portions, has a thickness equal to that of the initial lens blank 1, at least if measured at the same point. This precise definition is necessary because lens blanks for sunglasses and the lenses produced from them commonly have a thickness which is not exactly constant at every point. In reality, they show a degree of progressive variation in thickness, measured from the edges towards the geometric centre of the lens, or vice versa. The variation in thickness may be caused by operations for optimizing the optical performance, or may be due to technical characteristics of the production process used.

A second type of lens that can be produced by the method described is that which can be identified as a "differentiated thickness" lens, or as a lens with a "three-dimensional surface". This is a lens in which the thickness, measured at one or more points of the overmoulded portion, is different from the thickness measured at various points of the main part of the initial lens (the main part of the initial blank), and is possibly also different from point to point if measured at the different points of the overmoulded portion.

For example, it is possible to produce lenses with portions overmoulded with a thickness or height which is uniformly greater than that of the main part of the lens, or uniformly smaller, or selectively greater or smaller, according to a predetermined arrangement or geometrical model. In other words, a lens with a "three-dimensional" surface configuration can be produced, with abrupt or gradual local variations of thickness, according to the type of tactile or decorative effect or functional characteristic to be imparted to the lens.

Regarding the materials of the second overmoulded lens portion 5 (or of the overmoulded portions), the nature and characteristics of these are selected according to the purpose of the application of this overmoulded portion.

For example, in the case of a purely decorative application, coloured materials are suitable, and these materials may be transparent, non-transparent, or with various degrees of transparency. The carefully designed adjacent placing and combination of different colours in the material of the blank and in the material of the overmoulded portions may impart particular originality and colour differentiation to the resulting lens.

Another example of a possible decorative application is the incorporation of materials of small size, such as glitter or sparkle materials. These materials may affect the optical characteristics of the lenses, and their use is therefore limit, in terms of the sizes of the glitter materials and their quantity in the lens material, by the need to provide the lens with the minimum optical characteristics specified by the product quality and safety standards in force for the field concerned. By producing a lens by the method described herein, a peripheral portion or a portion outside the visual field can be provided in the lens by the overmoulding of material which may incorporate a very large quantity of glitter material, or incorporate glitter material of larger sizes, without invalidating the protective filter function specified for the lens, according to the provisions of the aforementioned standards.

Also in regard to the selection of materials for the overmoulded portions, these may be characterized by high optical quality (equal to those of the initial blank), if they are to occupy portions of the lens which intrude, even if only partially, on the user's visual field. Alternatively, if intended to occupy purely peripheral areas of the lens, these materials may have an optical quality which is not particularly high, and may be based on technical characteristics similar to those of the typical materials of the frames.

If a functional purpose is added to, or replaces, the decorative application, then other, different, technical requirements must be considered in respect of the materials to be overmoulded. For example, the function of the overmoulded portions may require a surface hardness or modulus of elasticity different from the hardness of modulus of elasticity of the material of the main portion of the lens. An overmoulded portion made of material having a lower hardness than the material of the main portion of the lens may be provided, for example, with the aim of producing a lens with "soft touch" portions, that is to say with portions which when touched, and also when viewed in some cases, are perceived as being typical of rubber or other softer materials.

As regards the nature of the materials suitable for overmoulding, given the technical requirements of the specific application, the materials considered in the first instance will be thermoplastic materials offering the greatest chemical compatibility, and therefore the greatest adhesive force, in respect of the material of the initial blank. For example, if the blank is made of polyamide, a preferred material for the overmoulding is the material known as TPU (thermoplastic polyurethane), which is available in various degrees of hardness, especially if the intention is to form a portion of softer material on a rigid polyamide lens. In this case, the compatibility between the two materials is high, and no additional arrangements are required to increase the adhesive force. Clearly, it is also possible to specify, for example, the overmoulding of polyamide on polyamide, that is to say the use of two versions of a polymer having the same basic nature, but modified so as to have different characteristics such as different colouring, finish, etc.

Another example is that of the material known as PEBA (polyether block amide), also available in various degrees of hardness, and also characterized by good direct adhesion to polyamide.

In the second place, the considerations described above are valid, relating to the possibility of acting in a number of ways on the surface of the initial blank to increase the degree of adhesion between two materials originally less suitable for mutual adhesion.

Among the types of lenses that can be produced by the method of the present invention in which the functional purpose is predominant, mention should also be made of lenses in auxiliary or additional mountings, having structures of plastic material for removable attachment to main mounting frames. We may mention, for example, the production of what are known as "clip-on" sunglasses, that is to say additional sunglasses mountings (with no sides) which can be applied to complete main mountings for visual purposes.

In this type of product, the structures for attaching the clip-on may include elements for elastic attachment, that is to say bushes or pins of more or less flexible material, hooks, blind or through holes, slots, or the like. They may also consist of complex structures, that is to say structures including both the system for attachment to the ophthalmic mounting and further mechanical elements, such as one or more hinges for lowering and raising the clip-on on the main mounting (in a "flip-up" type of auxiliary mounting).

With reference by way of example, but not exclusively, to the application in the field of clip-on spectacles, it should be noted that additional sunglasses may have two separate lenses produced by the method described herein (a right lens and a left lens), but may also be provided with a single lens (in this case, a lens having an extension such that it covers the whole visual field of the user), also produced by the method described herein.

Also with reference by way of example, but not exclusively, to the application for clip-on spectacles, it is also possible to produce joining elements between two lenses, even to the point of producing a true front frame or even a complete frame of rigid or soft material, by overmoulding on two lenses (right and left) or on a single lens (monolens spectacles, also known in this field as a "mask"). In this case, it is evidently impossible to replace the lenses in this type of spectacles, since the lenses are fixed to the front frame by the overmoulding.

Another type that can be produced is the lens with perimetric lining (complete or partial), for the purpose of facilitating the mounting of the lens in the frame (elastic mounting) or with the additional purpose of shock absorption between the lens and the lens frame.

Other possible applications of a perimetric lining of more or less flexible material may be mentioned, for example the case of an insulating lining for lenses (including single lenses) of spectacles or protective masks for sporting activities, such as the lenses of ski masks, or a lining designed for containing and sealing the contour of lenses with a multilayer structure which are potentially subject to delamination, such as some categories of polarizing lenses for sunglasses.

Concerning the advantages that can be gained with the method of the invention, in the first place it may be stated that the method presupposes the use of a lens blank, such blanks being commercially available in a wide range of dimensions, thicknesses, curvatures, materials, colouring, treatments, etc. When the blank considered most appropriate has been selected, the final shape of the lens can be cut out by means of a pantograph machine, or preferably a numerically controlled machine, that is to say by a process that is economical, flexible and fast as the regards the preparation of the equipment. In other words, for a given lens shape, the blank can be acquired from a different external manufacturer, without the need to produce a first suitable injection mould for use in the production of a lens already having its final shape, to be sent subsequently to a second suitable mould for the overmoulding.

With the claimed method, therefore, it is possible to produce a single injection mould, which will evidently allow for the precise geometrical characteristics of the initial blank (dimensions, curvature and thicknesses) to provide the greatest precision in the "mould closing" step of overmoulding, that is to say a perfect match between the surfaces of the blank and those of the mould cavity.

As regards the mould "impressions" or cavities corresponding to the lens portions to be formed by overmoulding, it is in any case possible to manufacture a mould for use in the production of multiple versions of lenses, essentially distinguishable by the different overmoulded portions, having different characteristics in terms of shape, dimensions, materials, surface finish, etc. For this purpose, according to the known methods of injection moulding, it is simply necessary to produce a mould equipped with what are known as interchangeable inserts, that is to say a mould in which some of the limited portions can be replaced alternatively, each portion bearing the negative of a specific variant of a portion to be overmoulded.

As a variant of the method, provision may be made for starting from a plastic lens blank made in-house, instead of one acquired from an external supplier. Clearly, in this case it is still necessary to prepare another injection mould, or a casting mould if appropriate, for producing the blank. However, it is possible to identify a degree of benefit in producing an initial blank which is again characterized by a regular shape, so that it can be cut, again, with a numerically controlled machine, thereby making it possible to produce a practically infinite variety of final lens shape without the need to use further injection moulds.

A further significant advantage of the method lies in the possibility of producing a lens covered with one or more aesthetic or functional "coatings" selected from those available in the field concerned, with the assurance of uniform covering, and therefore a good result in aesthetic terms, and/or high efficiency and durability of the coating.

It should be noted that, typically, the various coatings are applied by a process of immersion in a suitable bath, or by a process of deposition in a chamber under a vacuum. The precision and quality of the result of these processes are greatly influenced by even very small local variations in the lens thickness, which affect the result even at points located at a certain distance from the area, or line, of surface discontinuity. This is because local discontinuities may impede the correct flow of the deposition liquid over the surface of the lens during the treatment, in the case of application by immersion in a bath.

In the case of coating application in a vacuum chamber, a discontinuity or variation of thickness may interfere with the correct process of deposition of the coating on adjacent areas, for example by causing the deposition of a thinner and inadequate layer.

Consequently, in order to produce a lens of plastic material formed by at least two portions which are distinguishable from one another primarily in the different materials used, and covered at least partially by one or more functional and/or aesthetic coatings, and if the lens is subjected to one of these treatments after the overmoulding has taken place, the surface discontinuities which are evidently present to a more or less marked extent may result in certain defects in the applied coatings.

On the other hand, by using the advantageous method, according to the invention, of starting with a lens blank already covered with the desired coating and then proceeding to overmould the specified portions, the coatings originally present are clearly preserved, but only, obviously, in the areas of the lenses not subject to overmoulding. If it is considered that certain coatings must be applied to the overmoulded portions as well, a potentially higher rejection rate and production cost must be faced, but the application remains technically feasible.

Thus the invention achieves the proposed objects while yielding the stated advantages by comparison with the known solutions.

The invention claimed is:

1. A method of manufacturing spectacles lenses, comprising the steps of:
    providing a lens blank (1) made from plastic material, the lens blank (1) comprises faces opposite each other and is provided with at least one surface coating on at least one of the opposite faces of the lens blank (1),
    obtaining, by cutting the lens blank (1), a lens (2) having a final shape and profile suitable for mounting in a mounting frame,
    removing material from the lens (2) in predetermined areas of the lens, thereby obtaining a first lens portion (3), wherein the at least one surface coating is removed in areas affected by the step of removing material,
    inserting the first lens portion (3) into a mold (4) for overmolding,
    injecting material into the mold (4) to produce at least a second lens portion (5) overmolded on the first lens portion (3),
    removing the lens (2), in which the first and second lens portions (3, 5) are integrated with one another, from the mold.

2. The method according to claim 1, wherein the step of removing material includes removal by mechanical machining.

3. The method according to claim 2, wherein the step of removing material comprises a step of milling or laser machining of the lens (2).

4. The method according to claim 1, wherein the lens blank (1) is produced by an injection or casting process in a mold.

5. The method according to claim 1, wherein respective surfaces of the first lens portion (3) capable of contacting the overmolded material of the second lens portion (5) are identified in the areas of the lens (2) where material is removed, the method comprising the step of modifying these surfaces to increase adhesion between the materials of the first and second lens portions (3, 5) overmolded on to one another.

6. The method according to claim 5, further comprising modifying the surfaces physically, by mechanical machining thereby increasing superficial roughness of the surfaces.

7. The method according to claim 5 further comprising chemically modifying the surfaces, by local application of at least one surface coating in the form of a primer or other similar substance capable of promoting adhesion to the overmolded material.

8. The method according to claim 1, wherein the removal of material comprises a reduction in the thickness of the lens blank (1).

9. The method according to claim 8, wherein the thickness reduction of the blank (1) is carried out in an area of the perimetric profile of the lens (2) which extends near the edge of the lens and which covers at least a part of the overall lens contour.

10. The method according to claim 1, wherein the first lens portion (3) extends over a predominant part of the removed integrated first and second lens (2) portions and is configured to occupy a user's main visual field in order to correct the user's vision.

11. The method according to claim 1, wherein the lens blank (1) is made from polyamide by an injection molding process.

12. The method according to claim 1, wherein the lens blank (1) is made from a thermosetting material by a casting process in a forming mold.

13. The method according to claim 11, wherein the second lens portion (5) is made by overmolding with TPU (thermoplastic polyurethane) or polyamide or PEBA (polyether block amide).

* * * * *